United States Patent [19]

Keith

[11] Patent Number: 5,587,054

[45] Date of Patent: Dec. 24, 1996

[54] VAPOR COMPRESSION DISTILLATION SYSTEM

[75] Inventor: Robert C. Keith, Redondo Beach, Calif.

[73] Assignee: Grano Environmental Corporation, Carson, Calif.

[21] Appl. No.: 320,235

[22] Filed: Oct. 11, 1994

[51] Int. Cl.⁶ ........................................ B01D 3/10
[52] U.S. Cl. ................ 202/182; 159/24.1; 159/28.6; 159/46; 159/DIG. 16; 159/DIG. 30; 202/176; 202/202; 202/205; 203/23; 203/24; 203/26; 203/91; 203/DIG. 8
[58] Field of Search ........................ 203/26, 24, 91, 203/100, 23, 11, DIG. 8, DIG. 14; 202/182, 155, 236, 186, 205, 176, 172, 202; 159/DIG. 16, 24.1, DIG. 30, 46, 28.6

[56] References Cited

U.S. PATENT DOCUMENTS

| | | | |
|---|---|---|---|
| 3,214,352 | 10/1965 | Wells | 203/11 |
| 3,288,685 | 11/1966 | Kemper et al. | 203/11 |
| 3,783,108 | 1/1974 | Huhta-Koivisto et al. | 203/11 |
| 3,956,072 | 5/1976 | Huse | 203/26 |
| 4,292,121 | 9/1981 | Caffes | 159/DIG. 16 |
| 4,381,971 | 5/1983 | Dietrick | 203/DIG. 14 |
| 4,427,495 | 1/1984 | Masero | 202/234 |
| 4,438,730 | 3/1984 | Link et al. | 203/26 |
| 4,555,307 | 11/1985 | Hagen | 203/23 |
| 4,613,412 | 9/1986 | MacDermid | 203/DIG. 14 |
| 4,715,433 | 12/1987 | Schwarz et al. | 165/166 |
| 4,763,488 | 8/1988 | Johnston | 203/23 |
| 5,366,514 | 11/1994 | Becnel, Jr. et al. | 203/24 |

FOREIGN PATENT DOCUMENTS 1041312  2/1986  Japan ............................ 202/182

*Primary Examiner*—Virginia Manoharan
*Attorney, Agent, or Firm*—Brady, O'Boyle & Gates

[57] ABSTRACT

A vapor compression distillation system including a boiler/condenser assembly wherein a portion of the condensate is redirected back to the condenser inlet to extract superheat from the compressed vapor and transfer it to the liquid in the boiler. The vapor entering the condenser is reduced to a saturation condition to prevent heat build up in the condenser to improve heat transfer efficiency. When the temperature of the incoming feed water is within the operating range of the boiler/condenser assembly, the system is operated under vacuum sufficient to match the boiler temperature with the temperature of the incoming feed water so that no preheater or waste heat recovery exchanges are required.

4 Claims, 4 Drawing Sheets

VAPOR COMPRESSION DISTILLATION SYSTEM

BACKGROUND OF THE INVENTION

The vapor compression distillation system of the present invention employs a plate-in-frame type heat exchanger as disclosed in my copending patent application Ser. No. 08/320,233, filed Oct. 11, 1994, and which is constructed and arranged to cause a majority of the liquid on the condensing surface to occupy a minority of the condensing surface area to thereby improve the overall heat transfer between the boiling feed and condensing vapors. The plate-in-frame type heat exchanger disclosed in the aforementioned patent application is an improvement on the plate-in-frame type heat exchanger disclosed in U.S. Pat. No. 4,671,856. The vapor compression distillation system of the present invention is a further improvement over the system disclosed in the above-noted patent in that the compressed vapor is de-superheated as it enters the condensing chambers of the boiler/condenser assembly, and the heat extracted from the compressed vapor is transferred into the boiler in order to prevent heat build-up in the condenser from decreasing the energy efficiency of the process.

The superheating of compressed vapor has long been recognized as an undesirable but unavoidable consequence of compressing the vapors in a fixed displacement roots type blower. In relation to vapor compression between the boiler and condenser, superheat is particularly undesirable because the lower heat transfer coefficient of superheated steam requires a higher differential temperature for a given condensation rate. The higher differential temperature implies a lower efficiency for the process. Attempts have been made to correct the problem but they usually involve additional equipment and do not manage to utilize all of the heat extracted from the vapor in the process of de-superheating it.

A further improvement over the system disclosed in the above-noted patent is also provided by operating the system under sufficient vacuum to match the boiler temperature with the temperature of the incoming feed fluid, to thereby eliminate the requirement for, and heat loss implicit in, a waste heat recovery system. The elimination of a waste heat recovery system is advantageous in that it eliminates capital and operating costs for heat exchangers, pumps, and flow control systems, and the overall thermal efficiency of the process is improved since a heat exchanger based waste heat recovery system will be limited in its ability to recover heat by the approach temperature of the heat exchanger.

SUMMARY OF THE INVENTION

The vapor compression distillation system of the present invention comprises, essentially, a boiler/condenser assembly wherein a portion of the condensate is redirected back to the condenser inlet, either as a liquid stream or a mist, whereby superheat is extracted from the compressed vapor and transferred to the liquid in the boiler. Since the liquid is at the saturation temperature corresponding to the condenser pressure, the liquid is vaporized by this heat transfer. The vapor entering the condenser is thus reduced to a saturation condition preventing heat build up in the condenser and improving heat transfer efficiency.

The boiler/condenser assembly is adapted to operate at a temperature range from 155° F. to 212° F. and since, in some large waste water applications, the feed water to the distillation system is already at 165° F. to 170° F., no preheater or waste heat recovery exchangers are required. Instead, the system is operated under vacuum sufficient to match the boiler temperature with the temperature of the incoming feed water.

In some instances, the incoming feed water is below 155° F. so that the incoming feed water has to be preheated by a heater and/or concentrate and condensate heat exchangers.

DESCRIPTION OF THE PREFERRED EMBODIMENT

Figure 1:
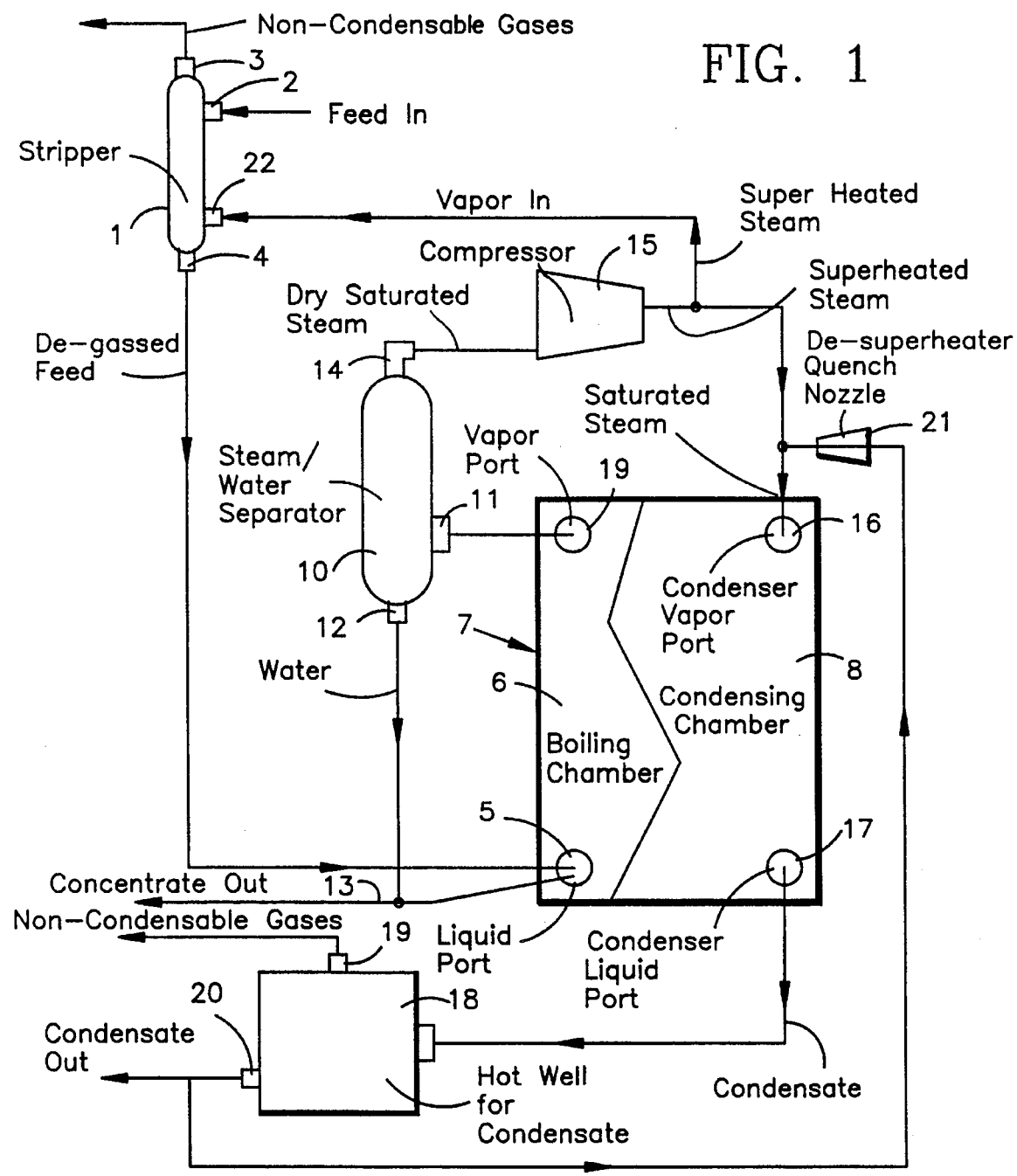
FIG. 1 is a diagrammatic view of the vapor compression distillation system of the present invention wherein a quench nozzle is employed to re-direct a portion of the condensate back into the condenser inlet.

Referring to the drawings and more particularly to FIG. 1, a vapor compression distillation system is illustrated wherein the liquid feed material to be purified enters a gas stripper 1 as at 2 wherein non-condensable gases are extracted as at 3 and the degassed feed flows from the stripper outlet 4 to the liquid inlet port 5 of the boiler chamber 6 of a plate-in-frame type heat exchanger 7 of the type described in my aforementioned copending patent application wherein the feed material is caused to boil by the heat generated in the condensing chamber 8. The evaporated portion of the feed material exits the boiling chamber as at 9 while the liquid concentrate is discharged from the boiler 6 through the liquid port 5. The vapor is fed into a steam/water separator 10 as at 11 where the separated water is discharged as at 12, and fed to the liquid concentrate outlet line 13. The steam exits the top of the separator 10 as at 14 and is fed into a compressor 15 where the steam becomes superheated. The exhausted superheated steam is fed into the condenser vapor port 16 communicating with the condensing chamber 8 of the heat exchanger 7, whereby the condenser is maintained at a higher temperature than the boiler so that the heat released by the steam vapor as it condenses is transmitted back into the boiling chamber 6 to boil and evaporate the incoming feed material. The condensate is discharged from the condensing chamber 8 through condenser liquid port 17 and into a condensate hot well 18 where non-condensable gases are extracted as at 19 and the condensate is discharged as at 20.

In order to prevent heat build-up in the condenser which decreases the energy efficiency of the process, a portion of the condensate being discharged from the condensate hot well is fed to a quench nozzle 21 positioned in proximity to the condenser vapor port 16. The condensate is sprayed onto the incoming compressed vapor, whereby superheat is extracted from the compressed vapor. The vapor entering the condenser is thus reduced to a saturation condition preventing heat build-up in the condenser and improving heat transfer efficiency.

To complete the system illustrated in FIG. 1, a portion of the superheated steam being exhausted from the compressor 14 is fed into the stripper as at 22.

Figure 2:
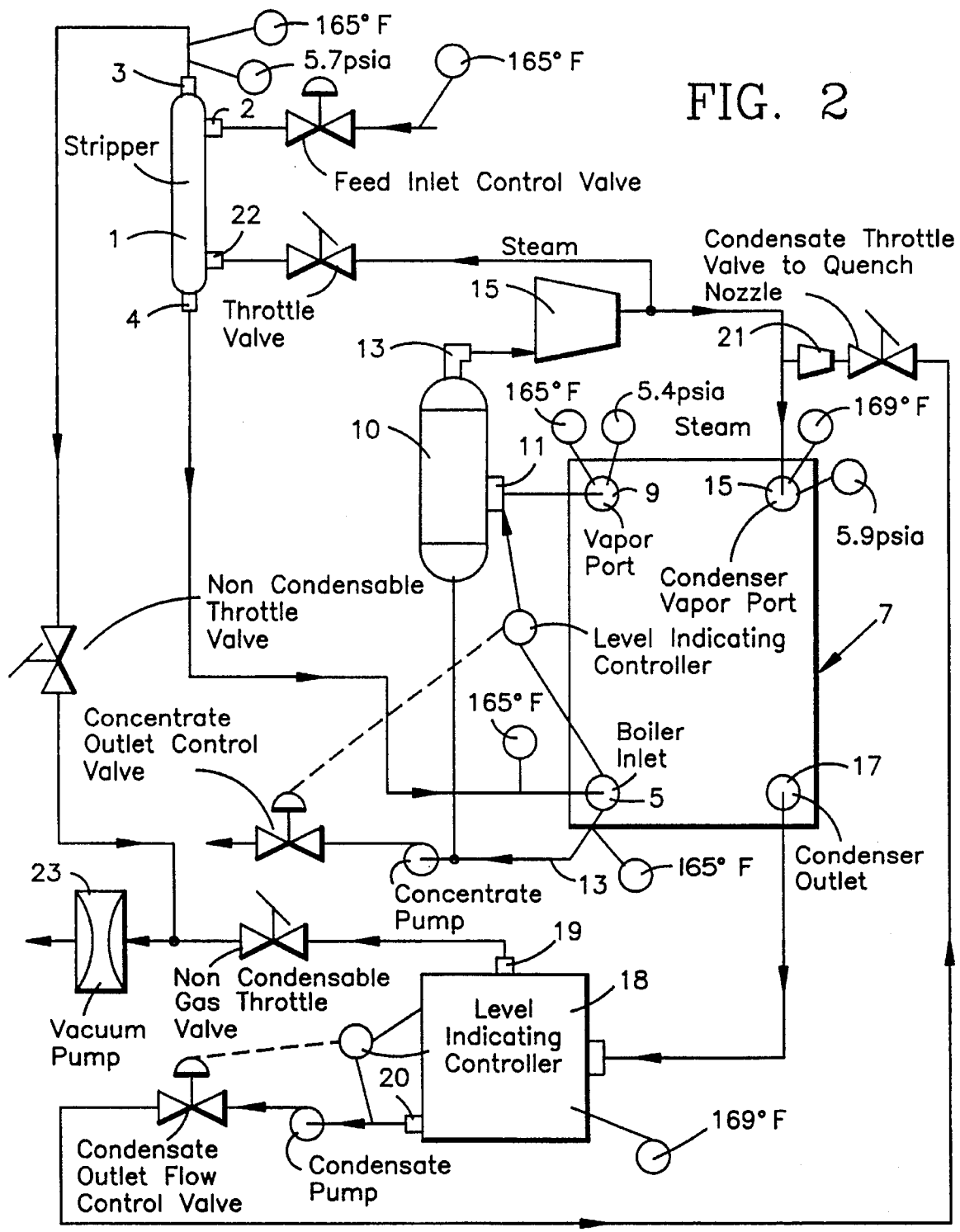
FIG. 2 is a diagrammatic view of the vapor compression distillation system of FIG. 1 with the addition of a vacuum pump for operating the system under sufficient vacuum.

The boiler/condenser assembly is adapted to operate at a temperature range from 155° F. to 212° F. and since, in some large waste water applications, the feed water to the distillation system is already at 165° F. to 170° F., no preheater or waste heat recovery exchangers are required. Instead, as shown in FIG. 2, the system is operated under vacuum sufficient to match the boiler temperature with the temperature of the incoming feed water, the vacuum being provided by a vacuum pump 23 having its inlet communicating with the non-condensable gases being exhausted from the stripper 1 and condensate hot well 18.

Figure 3:
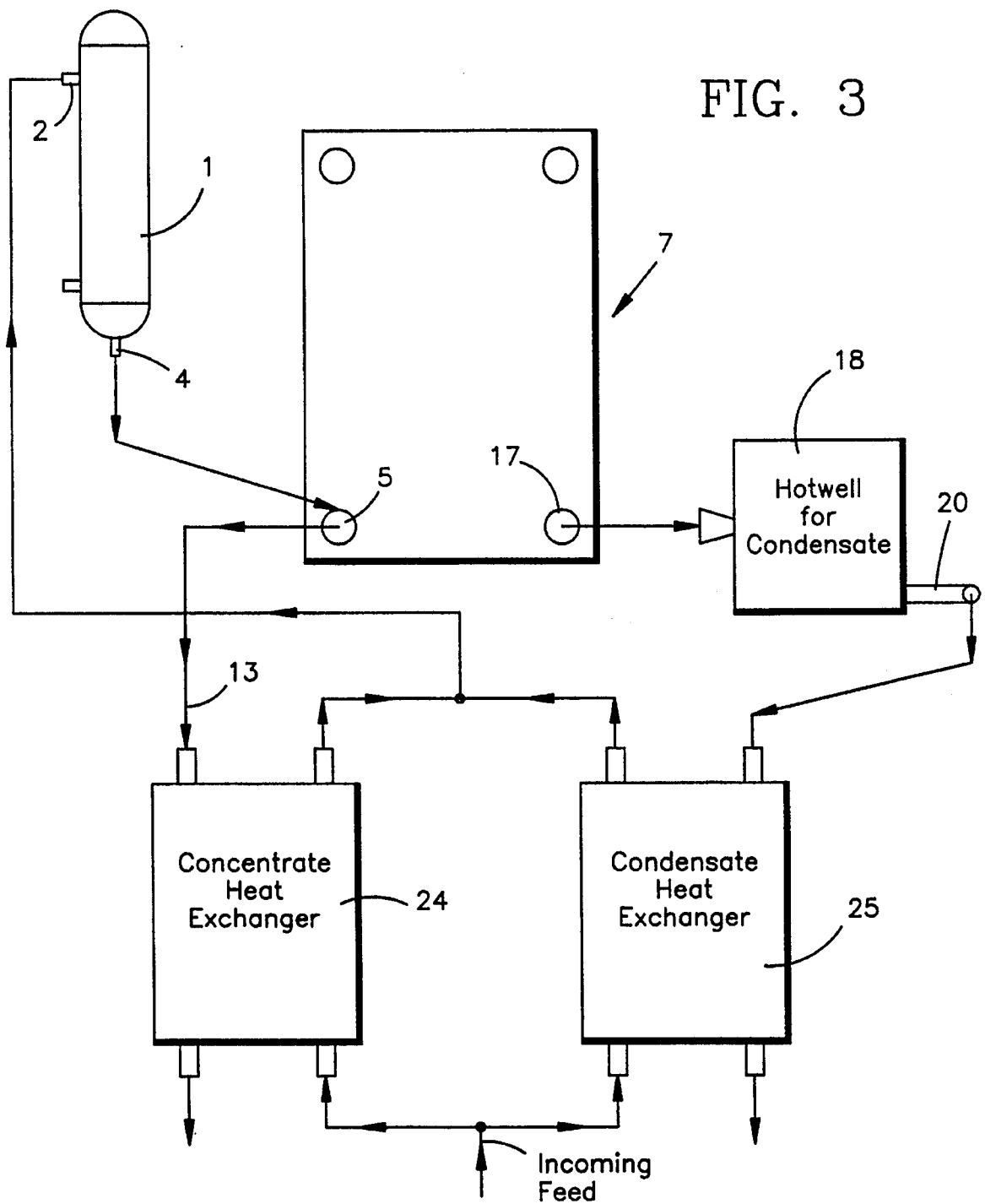
FIG. 3 is a diagrammatic view of a pre-heater arrangement for preheating the incoming feed fluid if it is below 155° F.

In some instances, the incoming feed water is below 155° F. so that the incoming feed water has to be preheated. As shown in FIG. 3, the incoming feed water is preheated by a concentrate heat exchanger 24 and a condensate heat exchanger 25. The concentrate heat exchanger 24 communicates with the concentrate line 13 from the boiler/condenser liquid port 5, and the condensate heat exchanger 25 communicates with the hot well condensate outlet 20. The incoming feed flows through both concentrate and condensate heat exchangers 24 and 25, and the preheated feed then flows into the inlet of the stripper 1 as described in connection with FIG. 1.

Figure 4:
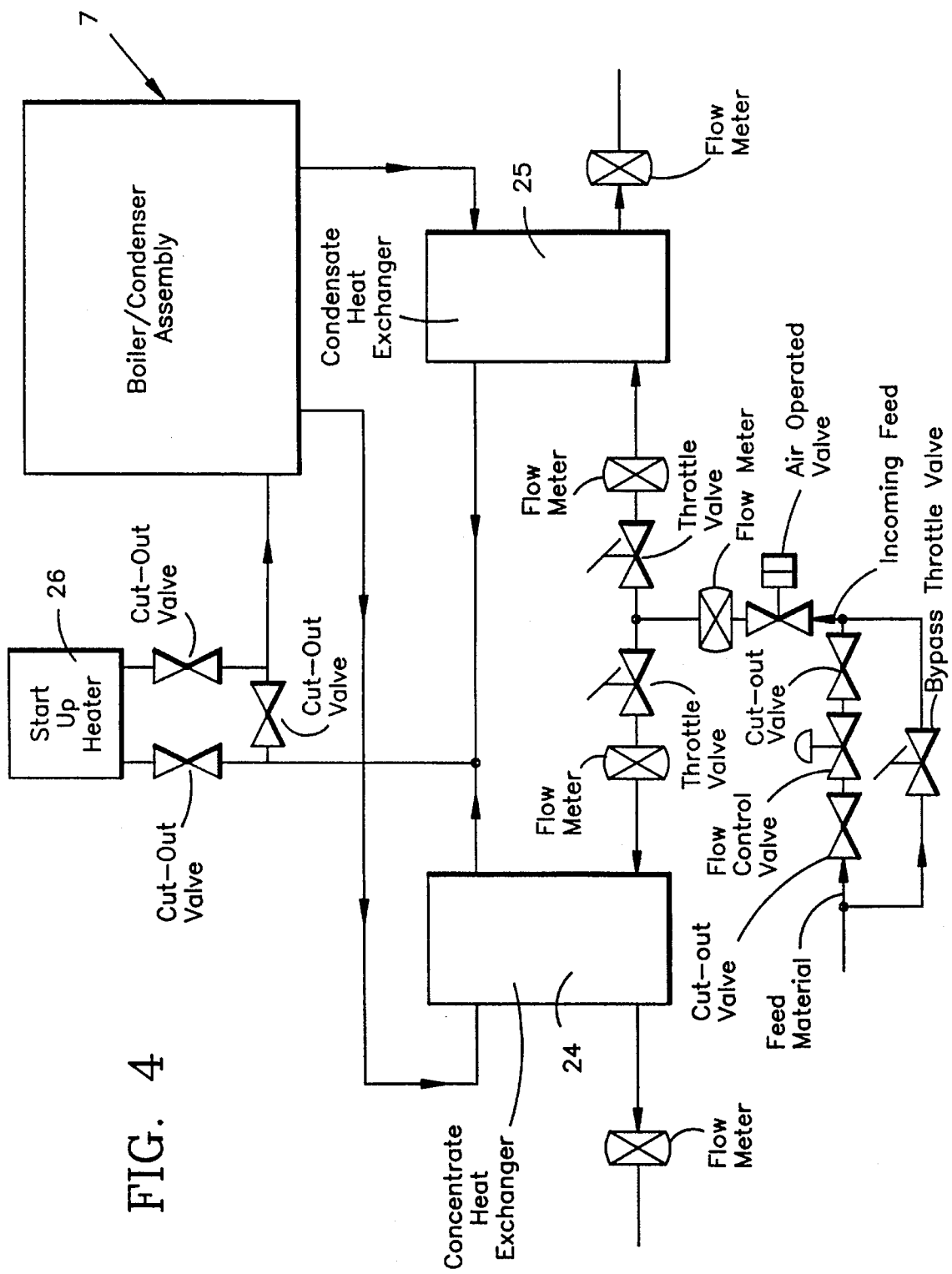
FIG. 4 is a diagrammatic view of the pre-heater arrangement shown in FIG. 1, and including a heater.

When the heat being generated by the concentrate and condensate heat exchangers 24 and 25 is not sufficient to preheat the incoming feed to the desired temperature, an additional heater is required as shown in FIG. 4, wherein a heater 26, such as an electric heater or a fossil fueled burner, is provided. The heater 26 communicates with the feed outlets of the concentrate and condensate heat exchangers 24, 25 which heats the feed, and consequently the concentrate and condensate, to a required temperature. Once the temperature of the concentrate and condensate has been raised sufficiently to preheat the infeed, the flow of the feed to the heater 26 can be interrupted by actuation of suitable cut-out valves.

From the above description, it will be apparent to those skilled in the art that the vapor compression distillation system of the present invention provides an improved system wherein a portion of the condensate is redirected back into the condenser inlet, either as a liquid or a mist, whereby superheat is extracted from the compressed vapor and transferred to the liquid in the boiler to thereby vaporize the liquid in the boiler. The vapor entering the condenser is reduced to a saturation condition preventing heat build-up in the condenser and improving heat transfer efficiency.

The boiler/condenser assembly is designed to operate at a temperature range from 155° F. to 212° F. so that no preheater or waste heat recovery exchangers are required when the distillation system is employed in a waste water application wherein the feed water is already at 165° F. to 170° F., the system being operated under vacuum sufficient to match the boiler temperature with the temperature of the incoming feed.

In instances where the incoming feed water is below 155° F., a suitable heater and/or concentrate and condensate heat exchangers are provided.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A vapor compression distillation system comprising, a plate-in-frame heat exchanger including a plurality of vertically extending plate members, a plurality of alternating boiling and condensing chambers on opposite sides of said plate members, means for conveying incoming feed material into said boiling chambers, a vacuum pump for providing the system with a vacuum for matching the temperature of the boiling chambers with the temperature of the incoming feed material, the inlet of said vacuum pump communicating with non-condensable gases from the incoming feed material and non-condensable gases from a condensate, a vapor outlet port communicating with said boiling chambers, a compressor having an inlet communicating with said boiling chambers, said compressor having an outlet communicating with a vapor inlet port for said condensing chambers, means for flowing an evaporated portion of the feed material in the boiling chambers through the vapor outlet port into the compressor to form superheated steam, means for feeding said superheated steam from the outlet of said compressor to an inlet of said condensing chambers, a condensate outlet port communicating with said condensing chamber, a quench nozzle positioned in proximity to and being in communication with the vapor inlet port of the condensing chambers, and means for directing a portion of condensate through the quench nozzle into the vapor inlet port for desuperheating the superheated system to reduce the steam temperature to saturated steam temperature as it enters the condensing chambers, such that the condensing chambers are maintained at a higher temperature than the boiling chambers, heat released by the steam as it condenses in the condensing chambers on one side of the plate members being transmitted through the plate members to the opposite side thereof into the boiling chambers to evaporate the incoming feed material, thereby providing a high heat transfer coefficient between the steam and plate members.

2. The vapor compression distillation system according to claim 1, wherein the temperature of the incoming feed material is within a temperature range of 155° F. to 212° F.

3. The vapor compression distillation system according to claim 1, wherein the temperature of the incoming feed material is below 155° F., a first heat exchanger having a plurality of inlet and outlet ports, a concentrate outlet communicating with the boiling chambers of the plate-in-frame heat exchanger, one of the inlet ports of the first heat exchanger communicating with said concentrate outlet, a second heat exchanger having a plurality of inlet and outlet ports, a condensate outlet communicating with the condenser chambers in said plate-in-frame heat exchanger, one of the inlet ports of the second heat exchanger communicating with said condensate outlet, means for feeding the incoming feed material through other inlet ports into said first and second heat exchanger, a feed material inlet communicating with the boiling chambers, outlet ports in said first and second heat exchangers communicating with said feed material inlet, whereby the incoming feed material is preheated before entering the boiling chambers of the plate-in-frame heat exchanger.

4. The vapor compression distillation system according to claim 1, wherein the temperature of the incoming feed material is below 155° F., a first heat exchanger having a plurality of inlet and outlet ports, a concentrate outlet communicating with the boiling chambers of the plate-in-frame, heat exchanger, one of the inlet ports of the first heat exchanger communicating with said concentrate outlet, a second heat exchanger having a plurality of inlet and outlet ports, a condensate outlet communicating with the condenser chambers in said plate-in-frame heat exchanger, one of the inlet ports of the second heat exchanger communicating with said condensate outlet, means for feeding the incoming feed material through other inlet ports in said first and second heat exchangers, a third heat exchanger having an inlet port and an outlet port positioned between the outlet ports of said first and second heat exchangers, outlet ports in said first and second heat exchangers communicating with the inlet port of said third heat exchanger, a feed material inlet communicating with the boiling chambers, the outlet port of said third heat exchanger communicating with the feed material inlet to the boiling chambers, whereby the incoming feed material is preheated by the first, second, and third heat exchangers.

* * * * *